United States Patent [19]

Eubanks

[11] Patent Number: 4,736,980
[45] Date of Patent: Apr. 12, 1988

[54] WINDSHIELD SHADE

[76] Inventor: Mentora D. Eubanks, 2555 Collins Ave., #2106, Miami Beach, Fla. 33140

[21] Appl. No.: 28,556

[22] Filed: Mar. 20, 1987

[51] Int. Cl.$^4$ ................................................ B60J 3/00
[52] U.S. Cl. .............................. 296/97 D; 296/97 G; 160/370.2
[58] Field of Search ............... 296/97 G, 97 D, 97 C, 296/95 C; 160/368 S, 25, DIG. 3

[56] References Cited

U.S. PATENT DOCUMENTS

| 1,913,961 | 6/1933 | Shape | 296/97 G |
| 2,363,762 | 11/1944 | Wardan | 296/97 G |
| 4,442,881 | 4/1984 | Monteath et al. | 296/97 D |
| 4,647,102 | 3/1987 | Ebrahimzadeh | 296/97 D |

FOREIGN PATENT DOCUMENTS

| 13779 | of 1928 | Australia | 296/97 G |
| 527915 | 6/1931 | Fed. Rep. of Germany | 296/97 D |
| 1093281 | 5/1955 | France | 296/97 G |

*Primary Examiner*—Robert R. Song
*Attorney, Agent, or Firm*—Robert M. Schwartz; Edward I. Mates

[57] ABSTRACT

A device for protecting the interior of a vehicle from damage and heat due to radiation while the car is parked in the sunlight, comprising a horizontally drawn shade of a heat reflecting material, such as flexible metal or plastic, having a pull member with an arcuate end portion and means for pivotally supporting a housing for said shade at or near one of the A-posts of an automobile and a cooperating member to receive a locking device secured to the free end of the shade pivotally attached to the other A-post of the vehicle. The shade is biased to be reeled into the shade housing so that when the pull member is aligned and attached to the tab member, the shade extends in close adjacency to the inner surface of a windshield of an automobile and can be readily applied across the windshield when the car is parked and readily removed from operative position when it is necessary to leave a parked position. The pivotal support for the housing makes it unnecesary to position the housing and the cooperating member in exact positions.

6 Claims, 2 Drawing Sheets

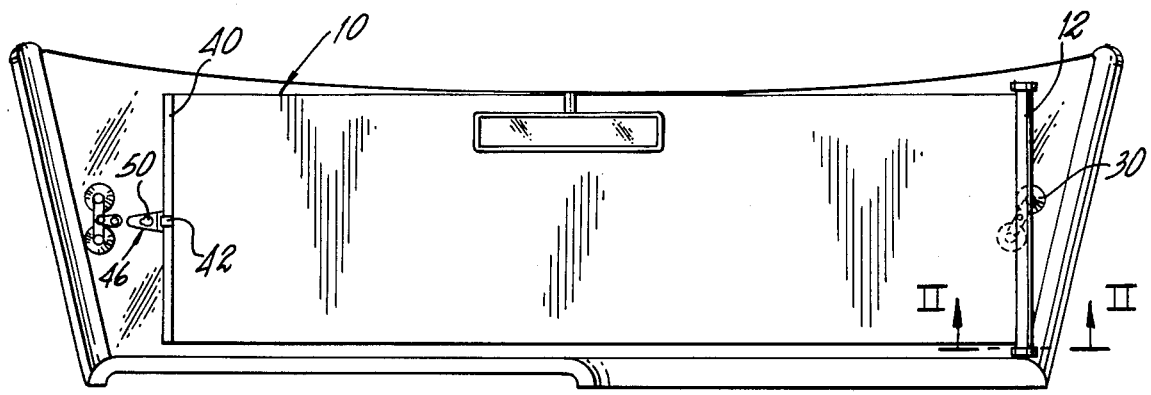
FIG - 1 -
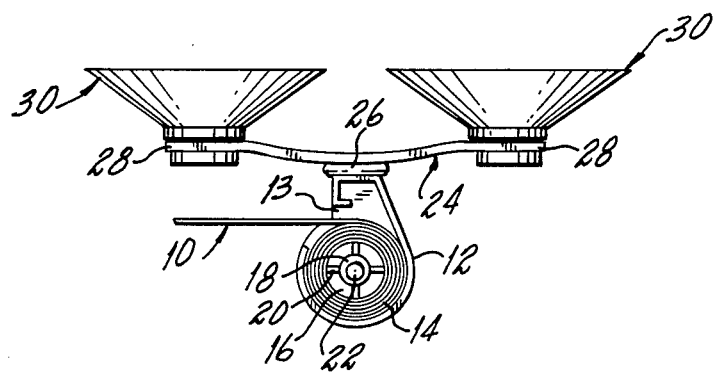
FIG - 2 -
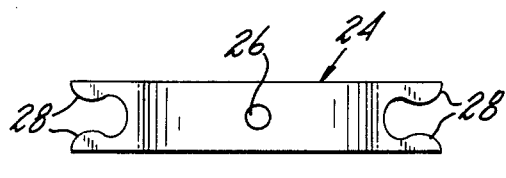
FIG - 3 -
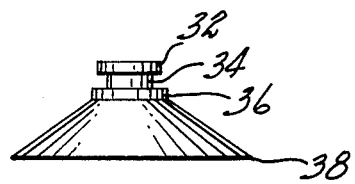
FIG - 4 -

WINDSHIELD SHADE

BACKGROUND OF THE INVENTION

An automobile that is parked in sunshine, even for only an hour or two, at a place where no shade is available, becomes so hot inside the vehicle that it is often impossible for the driver and passengers to enter the car. The heat sometimes reaches a degree making it impossible to touch the steering wheel and metal parts within the car. This heat results from solar radiation, due to penetration of sun rays through the windows of the car. In recent years, cars intended for passenger use have practically the upper half of the car body composed of glass to provide good visibility. Parked cars must have the windows locked to avoid possible theft of articles and other unauthorized entry during the time the car is parked. Because of the damage that solar radiation causes to the interior of the automobile and also the heat developed when a car is parked in sunshine, means are required to protect the interior of the vehicle from such nuisances and damage.

TECHNICAL PROBLEMS AND PRIOR ART

Automobiles have been provided with pivotable sunvisors that cover a small portion of the interior of the windshield when pivoted downward and into close proximity of the automobile roof. Any pivoting to cut off solar heating decreases the area of visibility through the windshield. Auxiliary devices have been added to increase the area of coverage, either within the inner surface of the windshield or outside the automobile in close relation to the windows of the automobile in order to reduce the amount of incidental radiation that is applied to the interior of the automobile. For one reason or another, these prior art devices fail to provide means that would be readily applicable to cover the windshield when the car is parked for a short period of time and that is readily disassembled from operative position and capable of being stored within the automobile in readily accessible position for use whenever such use is required.

Various patents of the prior art will be discussed to point out their deficiencies in this respect. While not all of the references mentioned are believed to be most relevant to this invention, the patents have been reported in a novelty search performed prior to the preparation of the application that matured into this patent. In order to fulfill the requirements of the patent statutes as to candor, all of the patents reported in the search report are disclosed and discussed.

U.S. Pat. No. 2,876,566 to Harrington shows a panel mounted to the rear of a front seat of a taxi to carry advertising matter for viewing by the taxi passengers. This device does not modify the amount of radiation received by the interior of the taxi when parked in sunlight.

U.S. Pat. No. 3,003,812 to Haugland shows a collapsible, louvered anti-glare device to protect the occupant of a vehicle from the glare of reflected light from the hood of the vehicle. Hinges connect the louvers, which extend horizontally, to control the height of the device. Even when this device is collapsed, it requires considerable space for storage, which interferes with the room for the feet of the passengers of an automobile.

U.S. Pat. No. 3,168,070 to Verney shows a warning sign carried in an auto on the forward surface of a sun visor and having its letters printed in mirror image to form at least one coherent word when seen in a rear view mirror of the preceding auto. This device does not modify the intensity of radiation received within a parked auto.

U.S. Pat. No. 3,254,435 to Rix shows a flat glare panel of small area attached to an upper portion of a windshield by a suction cup and shank. This device is capable of supporting a small plate containing advertising matter. Its effect on the amount of radiation received within the vehicle is modest.

U.S. Pat. No. 3,383,788 to Patzer shows a system for placing any selected message sign from a plurality of stored message signs into a viewing position within an automobile. While there may be some incidental interception of incoming radiation, the main purpose of this patented invention is to provide a message for viewing by someone in the vicinity of the vehicle and not to reduce the effect of incoming radiation.

U.S. Pat. No. 3,412,506 to Shiota shows mechanism to mount pivotable louvers adjacent vehicle windows. Special guide rails and gear wheels are provided within the vehicle to provide mechanism to move the pivotable louvers. This device is relatively massive and would be detrimental to gas mileage because of the mass of the mechanism.

U.S. Pat. No. 4,081,937 to Koch shows a sunshade device with spaced horizontal slots that are structurally reinforced. It is designed for use with the rear vision window of a vehicle and remains in place outside the vehicle. It limits the visibility of the driver along horizontal slotted areas.

U.S. Pat. No. 4,202,396 to Levy shows foldable sunshade devices that are unfolded to cover the inner surface of a windshield and folded to provide a stack of folded portions when not in use. Two sun visors engage the unfolded device along its upper edge while a dashboard supports its lower edge. Storage of the folded device is a problem because of the size of the rectangular portions that comprise the device.

U.S. Pat. No. 4,248,473 to Hildebrand shows an auxiliary sun-shade device movably and rotatably supported relative to a support bar on a main sunshade device about a horizontal axis and provided with panel members pivoted to one another about a vertical axis to enlarge and relocate the area of windshield shaded by the sun visors.

U.S. Pat. No. 4,332,414 to Surtin shows sunshade devices with overlapping slots that are held in overlapping relation by tapes. The sunshade devices of this patent are designed to cover substantially half of the windshield and leave exposed areas in between.

U.S. Pat. No. 4,348,978 to Brocado shows a single device adapted to be stored in a cylindrical container adapted to be clipped to a sun visor. The single device includes a mounting portion constructed to embrace the upper end of a vertically movably window of the vehicle to enable the window to support the single device when the latter extends outside its embraced window to provide a message for people who happen upon the vehicle.

U.S. Pat. No. 4,358,488 to Dunklinn et al uses as a heat screening device a perforated polymer laminated sheet fixed to the interior surface of a rear window of a vehicle, having a hatch back type rear panel to simulate the appearance of a three dimensional window louvre structure.

U.S. Pat. No. 4,363,513 to Sahar shows a casing carried by the roof of an auto. The casing stores four flexible curtains. Means is provided for moving stored curtains into positions covering the inner surfaces of the windshield, side windows and rear window of the auto and to turn the curtains into the casing as desired. The material for the curtains is flexible fabric. Such material is not the most efficient for reflecting incidental radiation.

In addition to the patented devices discussed, applicant's counsel has seen horizontal shade means of fabric composition rigidly supported by a first suction cup applied to one side of an automobile windshield and a button rigidly fixed to a second suction cup applied to the other side of the windshield. Unless the suction cups are applied in precise locations, such shade means is difficult, if not impossible, to retain in a locked operative position across the windshield due to the rigidity of the support of said housing and said button.

SUMMARY OF THE INVENTION

The present invention provides shade apparatus that is readily applied into its operative position to cover the interior surface of a windshield when a car is parked and readily disconnected from its operative position and easily stored in locations that will not annoy the occupants of the vehicle when use of the device is no longer needed. The preferred embodiments of the present invention utilize the opposite side end portions of the windshield or the opposite A-posts which form part of a supporting frame on to which the windshield is mounted to pivotally support cooperating structural elements of the retractable shade of this invention. These include a shade housing pivotally supported on a member connecting a pair of spaced suction cups attached to one windshield side portion or a first A-post and a cooperating tab member pivotally supported on a member connecting another pair of spaced suction cups attached to the other windshield side portion or a second A-post. The housing has an elongated opening and provides a storage space for a reel of a heat-reflecting shade of thin flexible metal or heat-reflecting plastic. The shade is constructed and arranged to extend from one end supported within the housing through the elongated opening from said housing to a free end. The shade is biased to be stored as a reel within the housing in the absence of a pulling force. A pull member having a free end of arcuate configuration is attached to the free end of the shade. A keyhole opening is provided in the pull member. The keyhole opening has a wide portion facing the housing opening and a narrow portion facing away from the narrow opening. Attachment means pivotally secures the shade housing to the windshield or the first A-post so the shade may be unreeled through the elongated opening in an essentially horizontal direction from the elongated opening. A second tab support member is provided on the second A-post, preferably on the driver's side. The second tab support member may be fixed or removably mounted at or adjacent to the second A-post. A tab member is pivotally supported on the second tab support member. A button constructed and arranged to be received within the wide portion of the keyhole opening is fixed to the pivotally supported tab member to pivot therewith and to be held within the narrow portion of the keyhole opening by the bias that tends to cause the shade to return into its coiled position holds the shade extended horizontally adjacent to and inside the inner surface of the windshield.

The pivotal supports for the shade housing and for the tab member reduce the criticality of the positioning for the shade housing and said tab member so that it is easier to secure the cooperating button and keyhole opening of this invention rather than prior art devices which use rigid rather than pivotal support for the cooperating elements of the shade. This difference results from the fact that it is inconvenient, and almost impossible, for one person to simultaneously extend the shade from a rigidly supported shade housing and also change the position of a rigidly supported cooperating element at the time the cooperating elements (button and keyhole opening) are secured. It is much more convenient and readily possible for one person to simultaneously change the orientation of the shade housing from which the shade and one of the cooperating elements extends and also that of the pivotally supported other cooperating element to reach a position in which the cooperating elements are engaged to hold the shade extended across the windshield. In other words, while it takes two people to insure exact engagement of the cooperating elements of the prior art shade (one person to secure a single vacuum cup and to adjust the orientation of the extension of the shade from the location of the vacuum cup and the other person to fix the rigid position of a vacuum cup to which the cooperating element is fixed, it is convenient for a single person to simultaneously pivot and extend the shade and its cooperating element and pivot the position of the other cooperating element while the elements engage.

In addition, each cooperating element of the present invention is positioned by a pair of suction cups rather than by a single suction cup as in the prior art device with which the present invention is compared. Therefore, it is less likely that the present invention will become disconnected than the prior art device.

It is understood that the pull member may be provided with the button and the tab member may be provided with the keyhole opening to receive the button attached to the pull member. Therefore, it is a very simple matter to cover the interior surface of the windshield by drawing the shade of flexible metal or heat reflecting plastic horizontally across the windshield.

The foregoing and other benefits of this invention will be understood better in the light of a description of a preferred embodiment that follows.

DESCRIPTION OF THE DRAWINGS

In the drawings that form part of a description of a preferred embodiment,

FIG. 1 represents a frontal elevational view looking towards the inside surface of a windshield provided with a shade conforming to the present invention partially drawn across the windshield;

FIG. 2 is a view taken along the line II—II of FIG. 1;

FIG. 3 is a plan view of a suction cup support device relative to which the shade supporting housing of FIGS. 1 and 2 is pivotally mounted, shown with suction cups removed;

FIG. 4 is an enlarged view of a typical suction cup used to form part of a device for securing the housing to the windshield near one A-post;

DESCRIPTION OF PREFERRED EMBODIMENT

Figure 5:
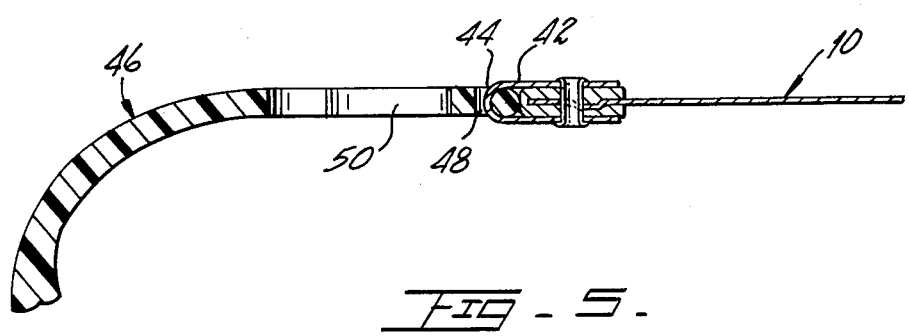
FIG. 5 is an enlarged sectional view of a reinforced free end of the shade of this invention with a pull member attached to the free end thereof.
Figure 6:
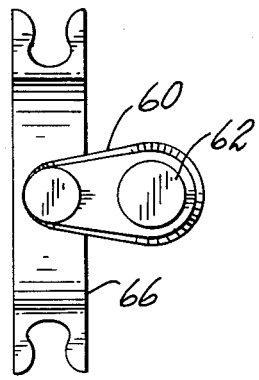
FIG. 6 is a plan view of a tab support member forming part of this invention.
Figure 7:
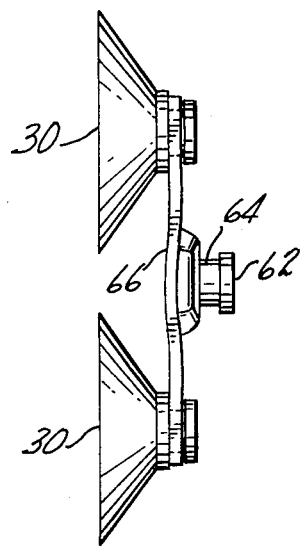
FIG. 7 is a view at right angles to that of FIG. 6 showing how a pair of suction cups are secured to the tab support member of FIG. 6.

Referring to the drawings, a windshield is shown mounted with its side edges received within A-posts. One of the A-posts is located adjacent the passenger door of the vehicle and the other A-post on the driver's side of the vehicle. A flexible aluminum shade 10 is shown partly extending from a shade housing 12 through an elongated opening 13 (FIG. 2). The shade 10 is supported in rolled condition within housing 12 as a reel on shade supporting aluminum roll 14. A plurality of cutouts 16 is provided at the lower end of the aluminum roll 14. A spring loaded sleeve 18 is provided with a plurality of lugs 20, one for each of the cutout portions 16. Sleeve 18 rotates about a rod 22.

A reversely curved elongated bar 24 is attached to an outer flat wall of housing 12 through a pivotable attachment 26. Reversely curved elongated bar is relatively flat and is provided with terminal fingers 28 have rounded inner edges at each longitudinal edge portion thereof. The terminal fingers 28 are designed to receive vacuum cups 30. Each vacuum cup 30 is provided with a head 32, a grooved portion or neck 34 below the head 32 and a shoulder 36 below the neck 34. A flexible perimeter portion 38 forms the vacuum cup at the bottom thereof. The terminal fingers 28 surround the necks 34 of the vacuum cups 30 to secure the vacuum cups thereto. Vacuum cups 30 are applied to the windshield end near the A-bar or directly to the A-bar, preferably on the side of the vehicle occupied by a passenger. While FIG. 2 shows the elongated bar 24 extending transversely to the length of the shade housing 12, it is understood that in the more usual position, shown in FIG. 1, the elongated bar 24 will be only angled slightly from the length of the housing 12 because of the manner in which the A-bars extend in automobiles and the showing in FIG. 2 is designed to illustrate the construction of the elongated bar 24 relative to the housing 12.

The shade 10 has a free end (FIG. 5) suitably enforced by a bifurcated reinforcement edge member 40 extending entirely across the free end of the shade 10 and a folded tab 42 with a free end directed to the shade housing 12. Tab 42 has an outer fold 44, that surrounds the bifurcated reinforcement edge member 40. A pull member 46, having a slot 48 that receives outer fold 44 has a keyhole opening 50. Keyhole opening 50 has a relatively wide portion facing the shade housing 12 and a narrow portion facing away from shade housing 12.

A pulling force applied to the pull member 46 causes shade 10 to be extended. When the pulling force is released, shade 10 is reeled back into the shade housing 12. Pull member 46 has a turned end to facilitate its being grabbed between a thumb and forefinger of an operator.

In order to retain the shade in its fully extended position, a pivotable tab member 60 provided with a button 62 having a neck 64 is pivotally supported on a tab support member 66. The latter is similar to the elongated curved bar 24 attached to the first A-post and also has a pivotal attachment 26 for attaching the pivotal tab member 60 to the tab support member 66. Terminal fingers 28 receive necks 34 of additional vacuum cups 30 to secure the pivotable tab members 60 through its tab support member 66 onto the windshield or other A-post, preferably at the driver's side of the vehicle. Thus, when a pulling force is applied to pull the pull member 46 in position wherein the wide portion of its keyhole opening 50 is aligned with the button 62, the button can move through the wide portion through the keyhole opening 50 and then upon release of the pulling force, tension causing the shade 10 to be reeled into the housing 12 holds the tab member 46 so that the narrow portion of the keyhole opening 50 engages the button 62 at its neck 64 so as to maintain the shade 10 in its horizontally extended position without requiring additional pulling force.

When a car is parked and it is expected that the parked car will be subject to exposure to sunlight that would cause damage to the interior fabrics of the vehicle or heating up of the temperature within the vehicle, the shade 10 is pulled until the pull member 46 is in a position sufficiently over the button 62 to enable the button 62 to engage the keyhole opening 50 which holds the shade in its extended position until such time as the vehicle is ready to be reoccupied. Pivoting the pivotal tab member 60 enables the position of the button 62 to be aligned properly with the position occupied by the keyhole opening 50 in pull member 46, even if the original orientations of the pulled shade 10 and/or pivotable tab member 60 must be modified to attain engagement.

It is understood, that the button 62 may be provided on pull member 46 and the keyhole opening 50 provided in the pivotal tab member 60, however, with the wide and narrow portion of keyhole opening 50 reversed in position with that shown in FIG. 1 so as to enable the same result to be obtained as in illustrated embodiment.

In accordance with the patent statutes, the principle, preferred construction and mode of operation of this invention has been explained and what is presently considered its best embodiment has been illustrated and described. However, it should be understood, that within the scope of the claimed subject matter that follows, the invention may be practiced otherwise than as specifically illustrated and described.

What is claimed is:

1. Apparatus for covering the inner surface of a vehicle windshield installed in a windshield supporting frame comprising a first A-post extending essentially vertically to support one side edge of said windshield and a second A-post extending essentially vertically to support the other side edge of said windshield, a housing having an elongated opening, a shade of thin heat reflecting material such as heat reflecting plastic or flexible metal constructed and arranged to extend to a free end from said elongated opening of said housing, such shade being biased to be stored as reel within said housing in the absence of a pulling force, a pull member attached to the free end of the shade, attachment means comprising a pair of spaced suction cups constructed to be secured to one side of said windshield or one of said A-posts, means to pivotally attach said housing to said attachment means so said shade may be unreeled through said elongated opening in an essentially horizontal direction through said elongated opening, a tab support member, means including a pair of spaced suction cups to secure said tab support member to said second side of said windshield or said second A-post, a tab member pivotally supported on said tab support member, a cooperating button and keyhole opening, one of said cooperating button and keyhole opening being part of said pull member and the other of said cooperating button and keyhole opening being part of said tab member, said keyhole opening having a wide portion and a narrow portion, said cooperating button and keyhole opening being constructed and arranged for said button to be received in—(a) said wide portion of said keyhole opening and to be held within said—narrow portion of said keyhole opening to hold said shade extended horizontally adjacent to the inner surface of said windshield, the pivotal support for said housing and said tab member facilitating engagement of said button and said keyhole opening even when said pairs of spaced suction cups are not positioned precisely in the optimum position that would be required for fixed securement of said housing and said tab member.

2. Apparatus as in claim 1, wherein said housing attachment means is constructed and arranged for removable attachment to said A-post on the passenger side of said vehicle and said tab support member securement means is constructed and arranged for removable attachment to said A-post on the driver's side of said vehicle.

3. Apparatus as in claim 1, wherein each of said pairs of suction cups is attached to the ends of an elongated reversely curved bar.

4. Apparatus as in claim 1, wherein said pull member contains said keyhole opening having its said wide portion facing said elongated housing opening and its said narrow portion facing away from said elongated opening and said tab member supports said button.

5. Apparatus as in claim 1, wherein said pull member comprises a button and said tab member comprises said keyhole opening having its said narrow portion facing said elongated housing opening and its said wide portion facing away from said elongated housing opening.

6. Apparatus as in claim 1, wherein said pull member has a curved free end to facilitate gripping thereof between a thumb and a forefinger of an operator.

* * * * *